(12) United States Patent
Tse et al.

(10) Patent No.: US 7,580,569 B2
(45) Date of Patent: Aug. 25, 2009

(54) METHOD AND SYSTEM FOR GENERATING CONTONE ENCODED BINARY PRINT DATA STREAMS

(75) Inventors: Francis K. Tse, Rochester, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 607 days.

(21) Appl. No.: 11/268,147

(22) Filed: Nov. 7, 2005

(65) Prior Publication Data

US 2007/0103731 A1    May 10, 2007

(51) Int. Cl.
*G06K 9/34* (2006.01)
(52) U.S. Cl. .................. 382/180; 358/3.06
(58) Field of Classification Search ........... 382/180
See application file for complete search history.

(56) References Cited

U.S. PATENT DOCUMENTS

| | | | |
|---|---|---|---|
| 4,958,236 A | | 9/1990 | Nagashima et al. |
| 5,008,950 A | | 4/1991 | Katayama et al. |
| 5,065,255 A | | 11/1991 | Kimura et al. |
| 5,293,430 A | | 3/1994 | Shiau et al. |
| 5,323,232 A | | 6/1994 | Otaka et al. |
| 5,617,459 A | * | 4/1997 | Makram-Ebeid et al. ...... 378/62 |
| 5,754,710 A | | 5/1998 | Sekine et al. |
| 5,818,964 A | * | 10/1998 | Itoh ........................... 382/205 |
| 5,850,474 A | | 12/1998 | Fan et al. |
| 5,959,290 A | | 9/1999 | Schweid et al. |
| 6,130,966 A | | 10/2000 | Sekine et al. |
| 6,229,578 B1 | | 5/2001 | Acharya et al. |
| 6,240,205 B1 | | 5/2001 | Fan et al. |
| 6,259,823 B1 | * | 7/2001 | Lee et al. .................. 382/268 |
| 6,282,325 B1 | | 8/2001 | Han |
| 6,285,464 B1 | | 9/2001 | Katayama et al. |
| 6,343,159 B1 | * | 1/2002 | Cuciurean-Zapan et al. 382/284 |

(Continued)

FOREIGN PATENT DOCUMENTS

EP        1583064        10/2005

(Continued)

OTHER PUBLICATIONS

File History for co-pending U.S. Appl. No. 11/272,182, as of Nov. 8, 2008.

(Continued)

*Primary Examiner*—Sath V Perungavoor
(74) *Attorney, Agent, or Firm*—Michael J. Nickerson; Basch & Nickerson LLP

(57) ABSTRACT

A method and system to convert an image described in a page description language to a contone image. The contone image is halftoned and encoded to generate image data including edge tag data and image data. A tagged state value of each pixel of image data within a predefined neighborhood of pixels is determined. The image data is filtered using a predetermined set of filter weighting values wherein each pixel of image data within the predefined neighborhood of pixels has an associated filter weighting value. A predetermined filtered image value is assigned to each pixel having a tagged state indicating an edge pixel. A summation of all filtered image values for the predefined neighborhood of pixels is assigned when the tagged state of the pixel is a non-edge pixel.

18 Claims, 17 Drawing Sheets

U.S. PATENT DOCUMENTS

| | | | |
|---|---|---|---|
| 6,477,282 B1 | 11/2002 | Ohtsuki et al. | |
| 6,594,401 B1 | 7/2003 | Metcalfe et al. | |
| 6,606,420 B1* | 8/2003 | Loce et al. | 382/266 |
| 6,608,701 B1 | 8/2003 | Loce et al. | |
| 6,683,702 B1 | 1/2004 | Loce et al. | |
| 6,771,832 B1 | 8/2004 | Naito et al. | |
| 6,873,437 B1 | 3/2005 | Kuwahara et al. | |
| 6,920,252 B2* | 7/2005 | Rouvellou | 382/275 |
| 6,975,434 B1 | 12/2005 | Pilu et al. | |
| 7,079,289 B2 | 7/2006 | Loce et al. | |
| 7,352,490 B1* | 4/2008 | Tse et al. | 358/1.9 |
| 7,372,992 B2 | 5/2008 | Ohshita | |
| 7,440,139 B2 | 10/2008 | Loce et al. | |
| 7,460,276 B2 | 12/2008 | Xu et al. | |
| 2002/0122602 A1* | 9/2002 | Rouvellou | 382/261 |
| 2002/0126912 A1* | 9/2002 | Rouvellou | 382/268 |
| 2002/0140983 A1 | 10/2002 | Shimizu | |
| 2002/0159096 A1* | 10/2002 | Sun et al. | 358/3.26 |
| 2002/0181797 A1* | 12/2002 | Young | 382/260 |
| 2002/0191857 A1 | 12/2002 | Macy | |
| 2003/0043210 A1 | 3/2003 | Hanks | |
| 2003/0090729 A1 | 5/2003 | Loce et al. | |
| 2003/0091222 A1* | 5/2003 | Young et al. | 382/132 |
| 2004/0114814 A1* | 6/2004 | Boliek et al. | 382/233 |
| 2004/0175037 A1* | 9/2004 | Guleryuz | 382/180 |
| 2005/0206948 A1* | 9/2005 | Uejo | 358/1.15 |
| 2005/0259886 A1 | 11/2005 | Jizhang | |
| 2006/0077489 A1 | 4/2006 | Zhang et al. | |
| 2006/0115182 A1 | 6/2006 | Deng et al. | |
| 2006/0132847 A1 | 6/2006 | Xu et al. | |
| 2006/0232798 A1 | 10/2006 | Xu et al. | |
| 2007/0053003 A1 | 3/2007 | Loce et al. | |
| 2007/0103731 A1* | 5/2007 | Tse et al. | 358/3.27 |
| 2007/0109602 A1* | 5/2007 | Tse et al. | 358/3.1 |
| 2007/0172148 A1 | 7/2007 | Hawley | |
| 2007/0172149 A1 | 7/2007 | Cuciurean-Zapan et al. | |
| 2007/0258101 A1 | 11/2007 | Nagarajan et al. | |
| 2008/0049238 A1 | 2/2008 | Nagarajan et al. | |

FOREIGN PATENT DOCUMENTS

| | | |
|---|---|---|
| EP | 1601184 | 11/2005 |
| GB | 2291308 | 1/1996 |
| WO | WO9930547 | 6/1999 |

OTHER PUBLICATIONS

He, Z.; Chang, T.; Allebach, J.; Bouman C.; Boundary Stitching Algorithm for Parallel Implementation of Error Diffusion; Xerox Corporation, 2004.

Farzin Aghdasi and Rahab K. Ward, Reduction of Boundary Artifacts in Image Restoration, IEEE Transactions on Image Processing, vol. 5, No. 4, Apr. 1996, pp. 611-618.

Unofficial File History for U.S. Appl. No. 11/340,391, as of Oct. 6, 2008.

Unofficial File History for U.S. Appl. No. 11/272,182, as of Oct. 6, 2008.

Unofficial Partial File History for U.S. Appl. No. 11/272,182, as of Feb. 10, 2009.

Unofficial European Search Report dated Feb. 25, 2009 for European Patent Application 06113615.6.

Unofficial Partial File History for U.S. Appl. No. 11/281,267 as of Jan. 27, 2009.

Unofficial file history of U.S. Appl. No. 11/126,970 between Dec. 8, 2008 and Jun. 2, 2009.

Unofficial Partial File History for U.S. Appl. No. 11/340,391, as of Oct. 6, 2008.

Unofficial Partial File History for U.S. Appl. No. 11/340,380 as of Nov. 17, 2008.

Unofficial Partial File History for U.S. Appl. No. 11/126,970 as of Dec. 8, 2008.

Unofficial Partial File History for US Patent 7440139, Dec. 17, 2008.

Unofficial Partial File History for US Patent 7460276, Dec. 17, 2008.

Unofficial Partial File History for U.S. Appl. No. 10/923,116 as of Dec. 9, 2008.

Unofficial Partial File History for U.S. Appl. No. 11/104,758 as of Dec. 9, 2008.

Unofficial Partial File History for U.S. Appl. No. 11/218,966 as of Dec. 9, 2008.

* cited by examiner

FIG. 13

| 0 | 0 | 255 (A) | 255 | 0 | 0 | 0 | 0 | 0 | 127 |
|---|---|---|---|---|---|---|---|---|---|
| 0 | 255 | 255 | 255 | 0 | 0 | 0 | 0 | 127 (B) | 127 (C) |
| 0 | 0 | 255 | 255 | 0 | 0 | 127 | 127 | 127 | 127 |
| 0 | 0 | 255 (D) | 255 | 0 (F) | 0 | 127 | 127 | 127 | 127 |
| 0 | 0 (E) | 255 | 255 | 0 | 127 | 127 | 127 | 127 | 127 |
| 0 | 0 | 255 | 255 | 127 | 127 | 127 | 127 | 127 | 127 |
| 0 | 0 | 255 | 255 | 127 | 127 | 127 | 127 | 127 | 127 |
| 0 | 0 | 255 | 255 | 127 | 127 | 127 | 127 | 127 | 127 |
| 0 | 255 | 255 | 255 | 255 | 127 | 127 | 127 | 127 | 127 |
| 127 | 127 | 127 | 127 | 127 | 127 | 127 | 127 | 127 | 127 |

| 01 | 10 C | 01 | 10 | 01 | 10 | 01 | 10 | 01 | 10 |
|----|------|----|----|----|----|----|----|----|----|
| 00 | 01 B | 10 | 01 | 10 | 01 | 10 | 01 | 10 | 01 |
| 00 | 00 | 01 | 10 | 01 | 10 | 01 | 10 | 01 | 10 |
| 00 | 00 | 00 G | 01 | 10 | 01 | 10 | 01 | 10 | 01 |
| 00 | 00 | 00 | 00 | 01 | 10 | 01 | 10 | 01 | 10 |
| 00 | 00 | 00 | 00 F | 00 | 01 | 10 | 01 | 11 | 01 |
| 11 | 11 | 11 | 11 | 11 | 11 | 11 | 11 | 11 | 10 |
| 11 A | 11 | 11 | 11 D | 11 | 11 | 11 | 11 | 11 | 01 |
| 00 | 11 | 00 | 00 | 00 E | 00 | 00 | 00 | 11 | 10 |
| 00 | 00 | 00 | 00 | 00 | 00 | 00 | 00 | 00 | 01 |

RECONSTRUCTION WITHOUT TAG INFORMATION

| 0 | 28 | 142 A | 113 | 57 | 0 | 0 | 0 | 28 | 57 |
|---|---|---|---|---|---|---|---|---|---|
| 28 | 113 | 198 | 170 | 85 | 0 | 0 | 28 | 57 B | 113 C |
| 28 | 113 | 198 | 170 | 85 | 0 | 28 G | 57 | 113 | 113 |
| 0 | 85 | 170 D | 170 | 85 F | 28 | 57 | 113 | 113 | 142 |
| 0 | 85 E | 170 | 170 | 113 | 57 | 113 | 113 | 142 | 113 |
| 0 | 85 | 170 | 170 | 142 | 142 | 113 | 142 | 113 | 142 |
| 0 | 85 | 170 | 170 | 142 | 113 | 142 | 113 | 142 | 113 |
| 28 | 113 | 198 | 227 | 170 | 142 | 113 | 142 | 113 | 142 |
| 28 | 113 | 198 | 170 | 142 | 113 | 142 | 113 | 142 | 113 |
| 85 | 142 | 170 | 170 | 142 | 142 | 113 | 142 | 113 | 142 |

FIG. 16

RECONSTRUCTION WITH TAG INFORMATION

| 0 | 0 | 255 A | 255 | 0 | 0 | 0 | 0 | 0 | 57 |
|---|---|---|---|---|---|---|---|---|---|
| 0 | 255 | 255 | 255 | 0 | 0 | 0 | 0 | 57 B | 113 C |
| 0 | 0 | 255 | 255 | 0 | 0 | 0 G | 57 | 113 | 113 |
| 0 | 0 | 255 D | 255 | 0 F | 0 | 57 | 113 | 113 | 142 |
| 0 | 0 E | 255 | 255 | 0 | 57 | 113 | 113 | 142 | 113 |
| 0 | 0 | 255 | 255 | 113 | 113 | 113 | 142 | 127 | 142 |
| 0 | 0 | 255 | 255 | 170 | 113 | 142 | 113 | 142 | 113 |
| 0 | 0 | 255 | 255 | 170 | 142 | 113 | 142 | 113 | 142 |
| 0 | 255 | 255 | 255 | 255 | 113 | 142 | 113 | 142 | 113 |
| 113 | 127 | 127 | 127 | 127 | 142 | 113 | 142 | 113 | 142 |

FIG. 17

METHOD AND SYSTEM FOR GENERATING CONTONE ENCODED BINARY PRINT DATA STREAMS

BACKGROUND AND SUMMARY

Digital multifunction reprographic systems are well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit which may re-order or reorganize these pages and then, depending on the request of the user of the device, send the pages or images to a destination. Often this destination is an attached printing unit which makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (page description languages) to the native format of the printing device.

An important inner component of such a conventional multifunction digital device is the image path. This is the combination of software and hardware elements that accepts the electronic images from a multiplicity of sources and performs any operations needed to convert the images to the format desired for the various output paths. The image path is usually one of the more complex and costly components of such digital multifunction devices.

The image path for a conventional multifunction device usually has several constraints. On the other hand, there is a desire to make the image path utilize data in a multi-bit per pixel format so as to provide for maximum image quality and a minimum loss of critical information in the transformation of documents from paper to electronic form. On the other hand, there are cost constraints and performance limits on the devices or software that comprise the image path.

Conventional image path electronics may also utilize binary image paths. In this situation, if the input information is scanned in a binary manner at sufficiently high resolution, the scanned image can be reconstructed at the output with little or no perceptible loss of image quality.

Another component of many conventional multifunction devices, especially for those devices having a printing engine that is capable of producing colored output, is the use of analog modulation schemes for the output. In these devices, analog data, in the form of multi-bit pixels, is presented to the modulator of the output printing device. The modulator compares the analog equivalent of the input byte of data to a periodic saw tooth wave. The output therefrom is a signal to the laser imaging component that is pulsewidth modulated by the data stream.

One recent development for conventional multifunction reprographic machines is the use of both binary and analog data in the image path. In such a hybrid image path, the data from the scanner is digitized and converted to binary. All of the intermediate elements of the image path are designed to work with the compact binary data format. Only at the output is the data converted to multi-bit analog form.

One way to implement the resolution conversion is to pass the binary data through the digital equivalent of a two-dimensional low pass filter. The low pass filter may replace each pixel in the binary image by the average of the values within some window centered on the pixel of interest. While such a system does an adequate job of converting the high resolution binary data to analog data, these solutions also have the deleterious effect of smearing sharp edges in the original document. Such an effect is particularly detrimental when reproducing text and line art.

A desirable modification to hybrid image paths would be a system wherein the conversion from binary format to analog format could take into account the existence of sharp edges in the image. Ideally such a scheme would be adaptive, that is, it would change its behavior so that it would apply a resolution conversion scheme appropriate to sharp edges for those parts of the image that have such edges, but use a different scheme that was better adapted to more continuous tone parts of the image.

Systems that implement resolution conversion processes, like those outlined above, show significant improvement in image quality compared to systems that do not implement resolution conversion processes. However, such systems are subject to problems. One such problem is the need to somehow distinguish those parts of the image that have edges from those parts of the image that do not. Various processes have been proposed to identify such regions and to develop an image parallel to that being reproduced, a tag image, that identifies those parts of the image that are edges.

All of the above processes deal with the copying process wherein a physical original is presented to the system and the scanner part of the system performs some processing on the digital image of the scanned original to generate the tag information. However, modern multifunction systems are also expected to function as digital printers, accepting input, usually in the form of a page description language format of the document to be printed. There is a component of such systems that converts the page description language form of the document into a form that can be processed by the image path and printing section of the multifunction machine.

If the page description language conversion process generates an analog image directly, any documents to be printed make heavy demands on the intermediate storage parts of the image path. Furthermore, the injection of such an image into the print path may be incompatible with the design of the copy image path which is designed to handle binary encoded image. This incompatibility is undesirable from a cost and performance standpoint. An alternative is to generate the images from the page description language as binary images. This makes the images from the page description language compatible with the copy path, but leaves a problem in that the images from the page description language are not tagged.

However, the page description language "knows" the exact location of any edges, whether the edges are associated with text or graphics. It would therefore be desirable if the page description language decomposition process could generate edge tags that would be compatible with those tags generated in the copy/scanning process so that images from the page description language would have the same high level of image quality as does the copy path.

Thus, it would be desirable to include in a full multifunction reprographic system a method and system to allow for the binary encoding of page images that come from a print data stream source in such a way that the page images from the print data stream source are compatible with the binary encoding scheme that is used for the copy and scan side of the machine. This would ensure that the output print quality of the machine is independent of the source of the documents being reproduced and would allow for a simpler and less expensive design of the product.

BRIEF DESCRIPTION OF THE DRAWING

The drawings are only for purposes of illustrating various embodiments and are not to be construed as limiting, wherein:

FIG. 13 illustrates an example of a contone image;

FIG. 14 illustrates the contone image of FIG. 13 encoded;

FIG. 15 illustrates the encoded image of FIG. 14 separated into single bit image and tag planes;

FIG. 16 illustrates the image of FIG. 15 reconstructed without the use of the tag plane;

FIG. 17 illustrates the image of FIG. 15 reconstructed using the tag plane.

DETAILED DESCRIPTION

Figure 1:
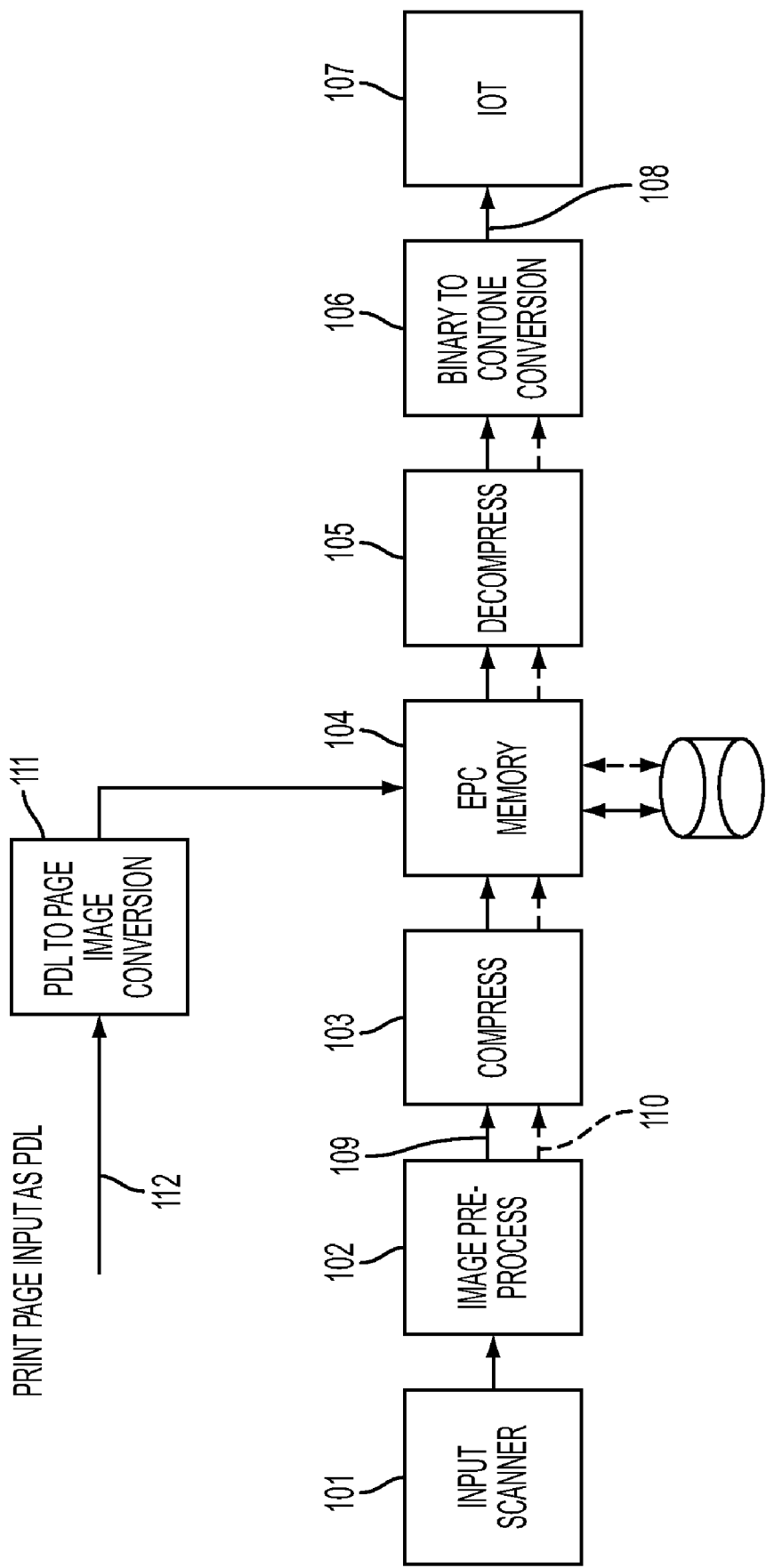
FIG. 1 illustrates the schematic flow of the image path for a multifunction reprographic machine.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates, in schematic form, the general image path of a full multifunction reprographic system. The image path is a combination of hardware and software elements that generate, process, and store the digital page images that are being processed by the system. A control system (not shown) configures each element of the image path depending on the user job. The control system also schedules the various jobs and functions of the entire system.

As illustrated in FIG. 1, digital scanner 101 accepts a hardcopy version of the page or pages to be copied and converts each page to a digital image, in contone form, at some moderately high resolution. Within the scanner 101, there are usually electronic elements that do some initial processing of the image, correcting, if needed, for any optical or illumination defects in the scanner 101.

The digital page image is then passed to a preprocessor 102 that performs further manipulations of the page image, such as editing, or tone curve correction. The preprocessor 102 converts the contone image from the scanner 101 to a binary image 109. The preprocessor 102 also can form a tag image 110. This tag image 110 can identify, at a pixel level, various characteristics of the underlying page image. For example, the tag image 110 can indicate whether a pixel in the page image is part of a sharp edge or not. Further details of the tag image will be described below.

After the preprocessing, the page and tag images are passed through a compression circuit 103 which losslessly compresses the page and tag images to a smaller size. The compressed images are then passed to a memory 104. The memory 104 stores each page image and its associated tag image, and keeps track of all the relevant sets of images that comprise the document being copied. The memory 104 can be used for many purposes, including for example, the ability to print multiple copies of an input document with a single scan. There are many other functions of the memory 104 that are well known to those skilled in the art.

When pages are ready to be printed, the pages are extracted from the memory 104 and sent to a decompression circuit 105. The decompression circuit 105 restores the compressed image to full size. The page image and its associated tag image are then passed to a binary to contone converter 106, which converts the binary image into a full contone image 108 that is in the proper format to drive the output printer (IOT) 107. As will be discussed below, the binary to contone converter may use the tag image to help convert the page image to a high quality print format image.

If the job to be reproduced is a print job, that is the job starts in electronic form; the input to the reprographic system is via the print data path 112. The job is assumed to be transmitted to the reprographic machine via some external communication channel. The control system in turn passes the print data stream, which is in the form of a page description language; for example Postscript; to print data converter 111. The page description language to print data converter 111 may be implemented as a software program on a general purpose microprocessor, in hardware, or in firmware. The page description language to print data converter 111 converts the page description language document into a set of page images that are in a binary format, identical to the binary image format used by the copy path. These page images are passed to the memory 104 for storage until ready to print. However, as noted above, in conventional systems, the print data stream is not tagged so that any information about edges is lost.

If the reprographic system is a full color system, printing pages in a full range of colors, the image path is logically the same, although there is additional processing to handle the extra information needed to convey the color aspects of the image. In particular in a color system, the red, green and blue (RGB) image format from the scanner is converted into an internal format; for example L*a*b* or some similar variant. Alternatively, the input RGB can be converted in the preprocessor stage to the CMYK colors needed at the output. In either case the logical processing of the page images is still the same; a separation for each dimension of the color space being processed is generated for each page image.

In describing a method for reconstructing a contone image from a high resolution binary representation of an original object, the following description assumes that the high resolution binary image is accompanied by the aforementioned parallel tag image wherein each pixel of the binary image is matched with a bit, called a "tag bit" that indicates whether the bit in the image represents a pixel at a density edge in the original image. The methods for determining how a tag bit is generated are well known to those skilled in the art.

Such methods include matching some region of the image against a set of patterns that are indicative of sharp density edges in the original, or alternatively by applying some sort of digital filter which is more sensitive to high frequency information in the original object.

For example, U.S. Pat. No. 6,130,966 describes an implementation of this tagging process. The entire content of U.S. Pat. No. 6,130,966 is hereby incorporated by reference.

In a non-tagged process of reconstructing an analog image from a binary image, the binary image is filtered using a matrix of pixels centered on the pixel being reconstructed. The values in this matrix are chosen to provide a digital filtering function when the pixels of the image are convoluted with the filter matrix.

An example of an equation governing a non-tagged process of reconstructing an analog image from a binary image is $$t_x = \sum_i \sum_j x_{ij} * f_{ij}$$

where $t_x$ is the output pixel, $x_{ij}$ is the input binary pixel at location (i,j) relative to the pixel under test, $f_{ij}$ are the filter weights, and the summation is over all the pixels in the filter window.

Figure 2:
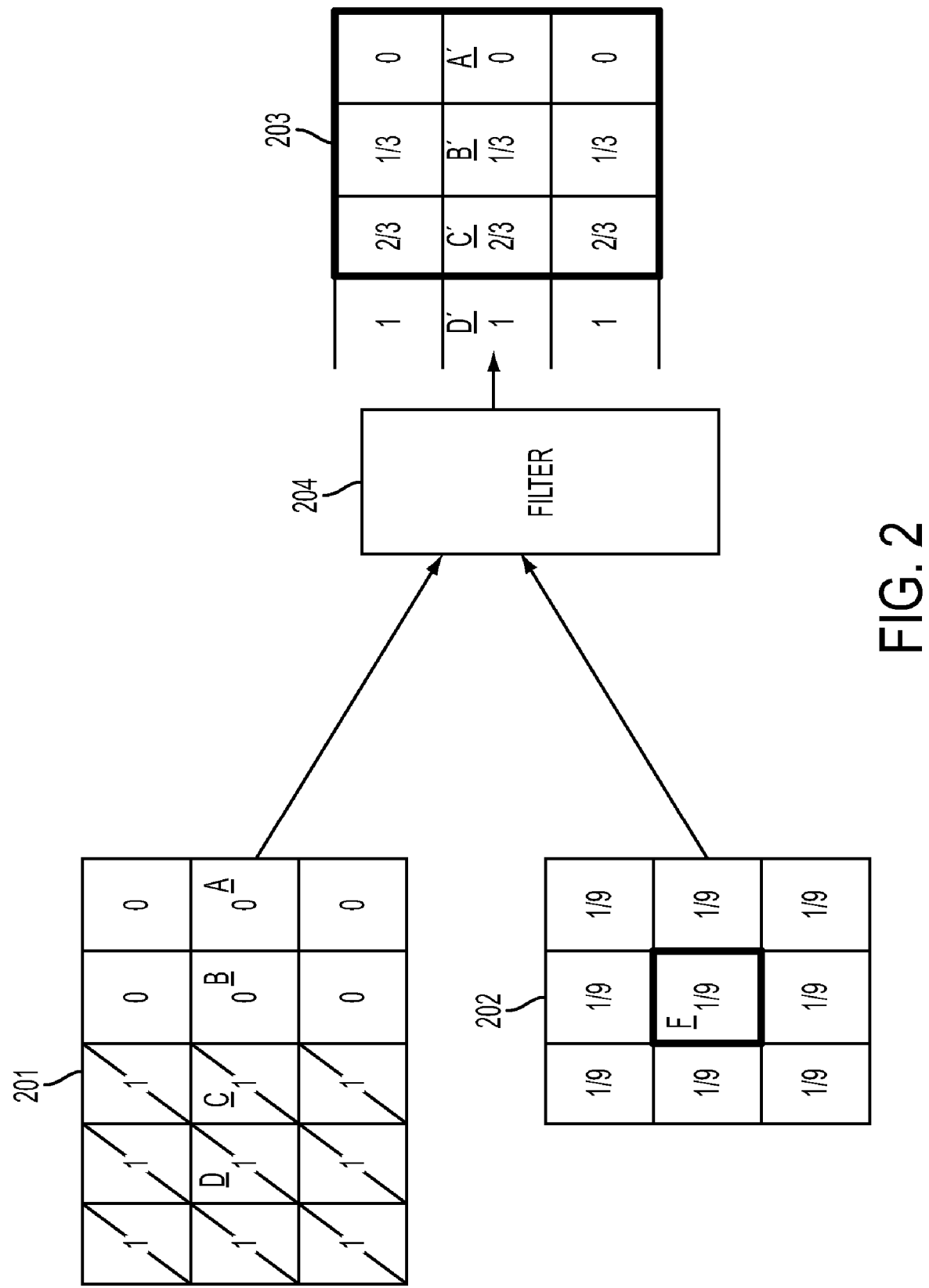
FIG. 2 illustrates a graphical representation of a digital filtering reconstruction of a multi-valued image from a binary image.

FIG. 2 illustrates an example of a filtering process. For this illustrative example, a 3×3 pixel filter is described. It is noted that any size filter may be utilized. Moreover, the pixel filter may perform simple averaging or be constructed of a more complex filter kernel. Notwithstanding the size or complexity of the filter, a description of a simple 3×3 pixel filter example will provide a demonstration of the principles of operation of this filter.

In FIG. 2, a portion of an image 201, in the form of a matrix, is shown. In the portion of the image 201, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 201. A filter kernel 202 provides a simple matrix of filter weights wherein an output pixel is the evenly weighted average of the nine pixels covered by the filter kernel 202. After a filter 204 performs the filtering operation, a portion of a output image 203 is generated.

The portion of the output image 203, as illustrated in FIG. 2, demonstrates that the original sharp edge of the portion of the image 201 has been smeared. More specifically, the original edge of the portion of the image 201 made the transition from "1" to "0" in a width of a single pixel. On the other hand, the filtered edge of the portion of the output image 203 now covers a width of three pixels.

In other words, when the pixel A of the portion of the image 201 of FIG. 2 is processed by the filter 204, the output pixel A' of the portion of the output image 203 has a value of zero indicating, in this example, a white region, assuming that the column to the right of the rightmost illustrated column contained only "0" values. It is noted that the pixel of interest has a filter position that is associated with the highlighted pixel position F.

Moreover, when the pixel B of the portion of the image 201 is processed by the filter 204, the output pixel B' of the portion of the output image 203 has a value of "⅓" indicating, in this example, a grey region. Furthermore, when the pixel C of the portion of the image 201 is processed by the filter 204, the output pixel C' of the portion of the output image 203 has a value of "⅔" indicating, in this example, a grey region.

Lastly, as illustrated, when the two columns to the left of the leftmost illustrated column contain only "1" values and the center pixel D of the portion of the image 201 is processed by the filter 204, the resulting output pixel D' of the portion of the output image 203 has a value of "1" indicating, in this example, a black region.

Figure 3:
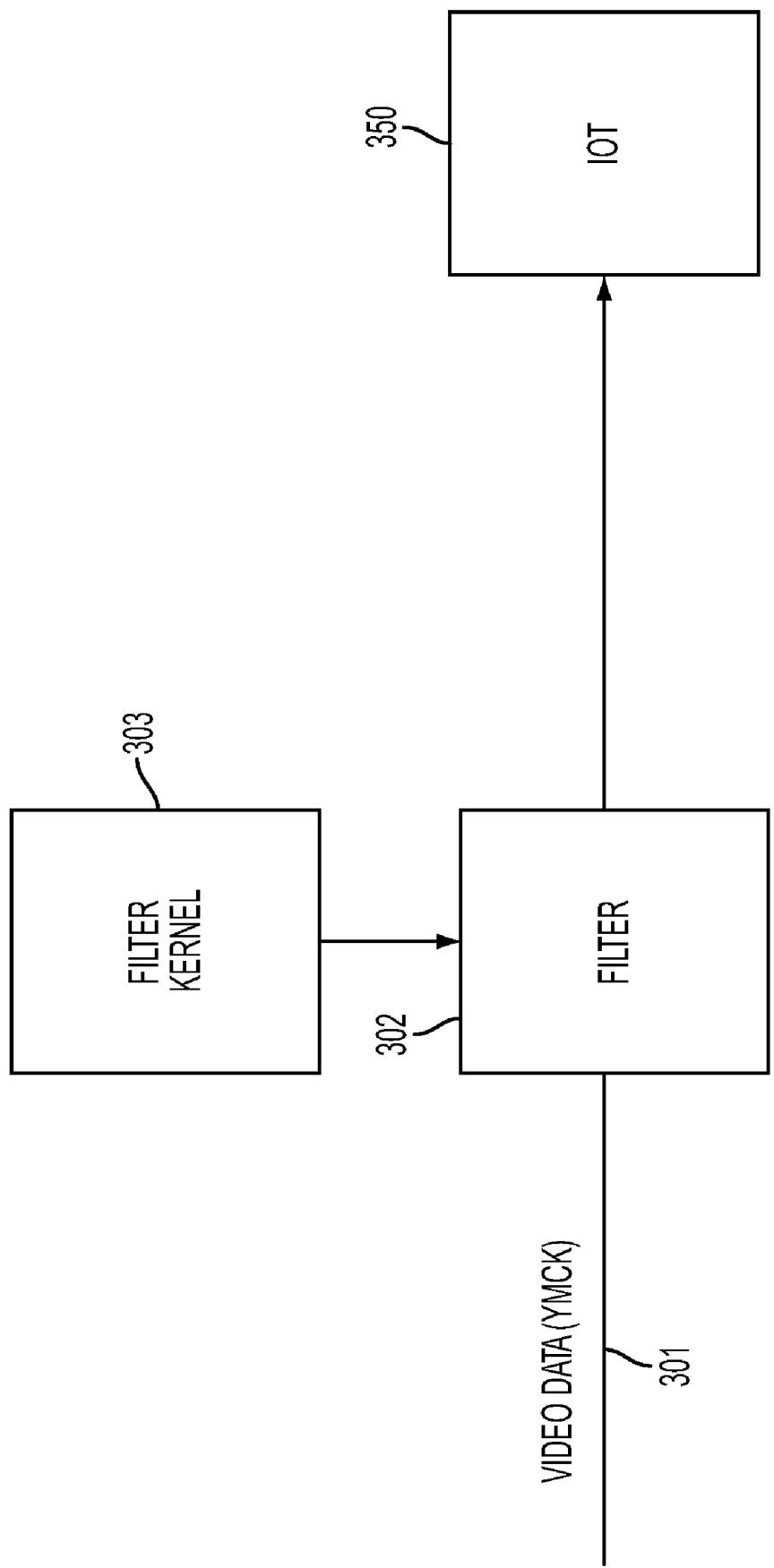
FIG. 3 illustrates a block diagram of a digital filtering process.

FIG. 3 illustrates a block diagram of a conventional device to implement the process illustrated in FIG. 2. As illustrated in FIG. 3, image data 301 is sent to a digital filter module 302, which accepts the image data and filter kernel data 303 and digitally filters to the image data. The output of digital filter module 302 is sent to an image output terminal (IOT) 350, which converts the image data to a hard copy of the image.

However, as noted above, the process of reconstruction will tend to soften edges. An edge is defined as a portion of the original image that has a rapid transition from high to low density or from low to high density. The softening problem may have the tendency of reducing the rapidity of such transitions. The visual effect of such edges is an apparent blur. This distortion is particularly objectionable in those areas of the original where text or line art is present. Text images depend on sharp edges at the edges of the characters to increase the ability of the reader to quickly distinguish different letter shapes.

Figure 4:
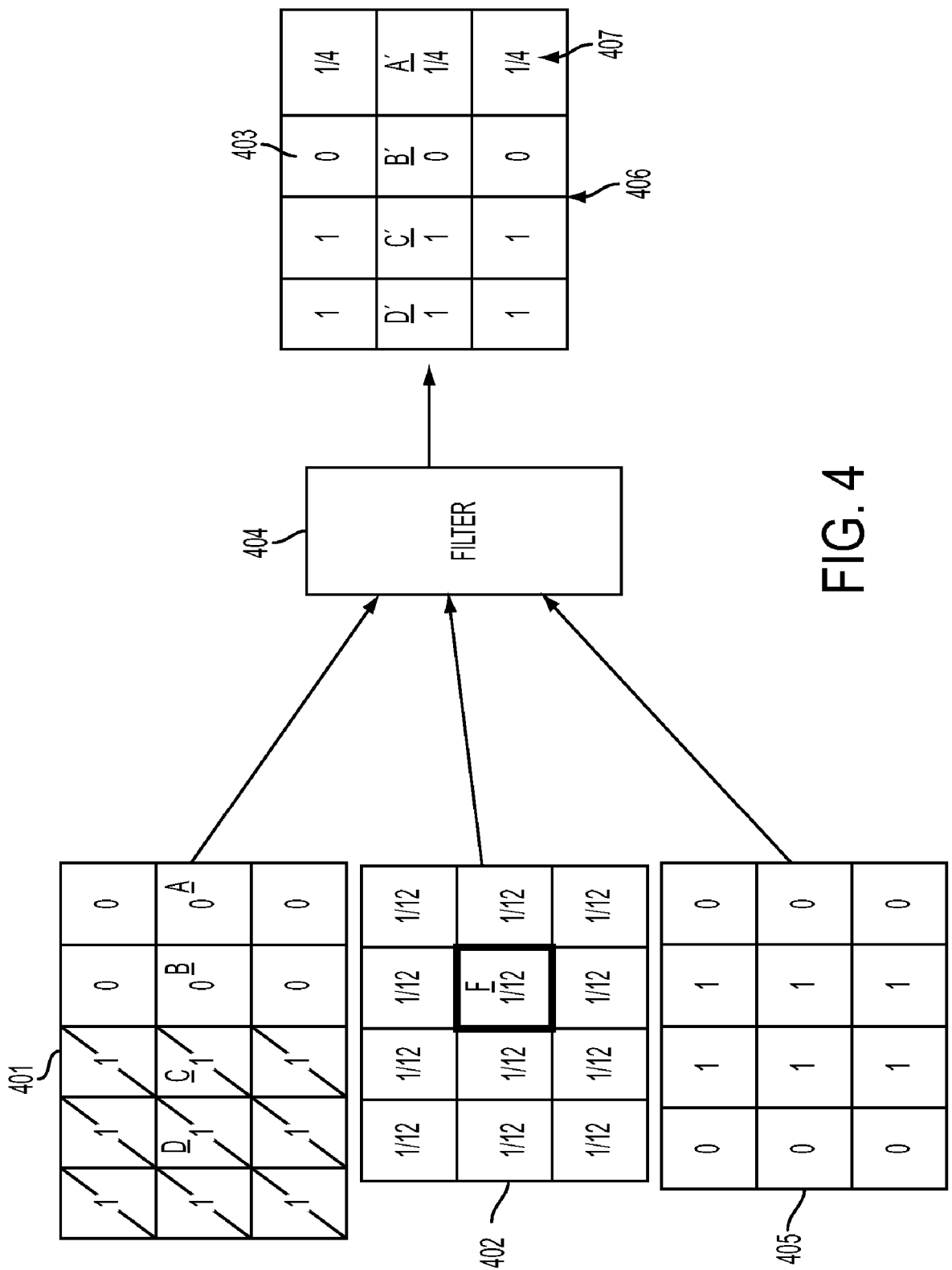
FIG. 4 illustrates a graphical representation of another modified digital filtering reconstruction that uses tag data to identify edges.

As noted above, the blurring of the output edge can be resolved through the use of tag data in conjunction with the image data. More specifically, if the pixel in question within the binary image is matched with a tag bit that indicates that it is an edge pixel, the filter is not applied to that pixel, but an analog level corresponding to high or low density, as the binary image bit is one or zero is output instead. FIG. 4 provides an illustration of this tag data integrated process.

In FIG. 4, a portion of an image 401, in the form of a matrix, is illustrated. In the portion of the image 401, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 401. A filter kernel 402 provides a simple matrix of filter weights wherein an output pixel is the evenly weighted average of the nine pixels covered by the filter kernel 402. Tag data is provided by tag matrix 405 wherein the tag data identifies the pixel as an edge "1" or non-edge "0." After a filter 404 performs the filtering operation using the image data 401, filter weights from filter kernel 402, and tag data from tag matrix 405, a portion of a output image 403 is generated.

The portion of the output image 403, as illustrated in FIG. 4, demonstrates that the original sharp edge of the portion of the image 401 has been converted to a sharp edge 406 with a ghost image artifact 407. More specifically, the original edge of the portion of the image 401 made the transition from "1" to "0" in a width of a single pixel. On the other hand, the filtered edge 406 of the portion of the output image 403 has a transition 406 from "1" to "0" being a width of a single pixel and a ghost artifact 407.

In other words, when the pixel A of the portion of the image 401 of FIG. 4 is processed by the filter 404, the output pixel A' of the portion of the output image 403 has a value of "¼" indicating, in this example, a ghost artifact 407, assuming that the column to the right of the rightmost illustrated column contained only "0" values. It is noted that the pixel of interest has a filter position that is associated with the highlighted pixel position F.

Since pixel A of the portion of the image 401 had not been tagged as an edge by tag matrix 405, the filter value for the pixel A of the portion of the image 401 is selected as the output value for output pixel A' of the portion of the output image 403. This selection of the filter value means that the output value includes the residual filter values, thereby creating the ghost artifact 407.

Moreover, when the pixel B of the portion of the image 401 is processed by the filter 404, the output pixel B' of the portion of the output image 403 has a value of "0" indicating, in this example, a white region because pixel B of the portion of the image 401 had been tagged as an edge by tag matrix 405, and thus, the filter value for the pixel B of the portion of the image 401 is not selected as the output value for output pixel B' of the portion of the output image 403, but the actual value of pixel B of the portion of the image 401 is passed through as the output pixel B' of the portion of the output image 403.

Furthermore, when the pixel C of the portion of the image 401 is processed by the filter 404, the output pixel C' of the portion of the output image 403 has a value of "1" indicating, in this example, a black region because pixel C of the portion of the image 401 had been tagged as an edge by tag matrix 405, and thus, the filter value for the pixel C of the portion of the image 401 is not selected as the output value for output pixel C' of the portion of the output image 403, but the actual value of pixel C of the portion of the image 401 is passed through as the output pixel C' of the portion of the output image 403.

Lastly, when the two columns to the left of the leftmost illustrated column contain only "1" values and the center pixel D of the portion of the image 401 is processed by the filter 404, the resulting output pixel D' of the portion of the output image 403 has a value of "1" indicating, in this example, a black region because pixel D of the portion of the image 401 had not been tagged as an edge by tag matrix 405, and thus, the filter value for the pixel D of the portion of the image 401 is selected as the output value for output pixel D' of the portion of the output image 403.

Figure 5:
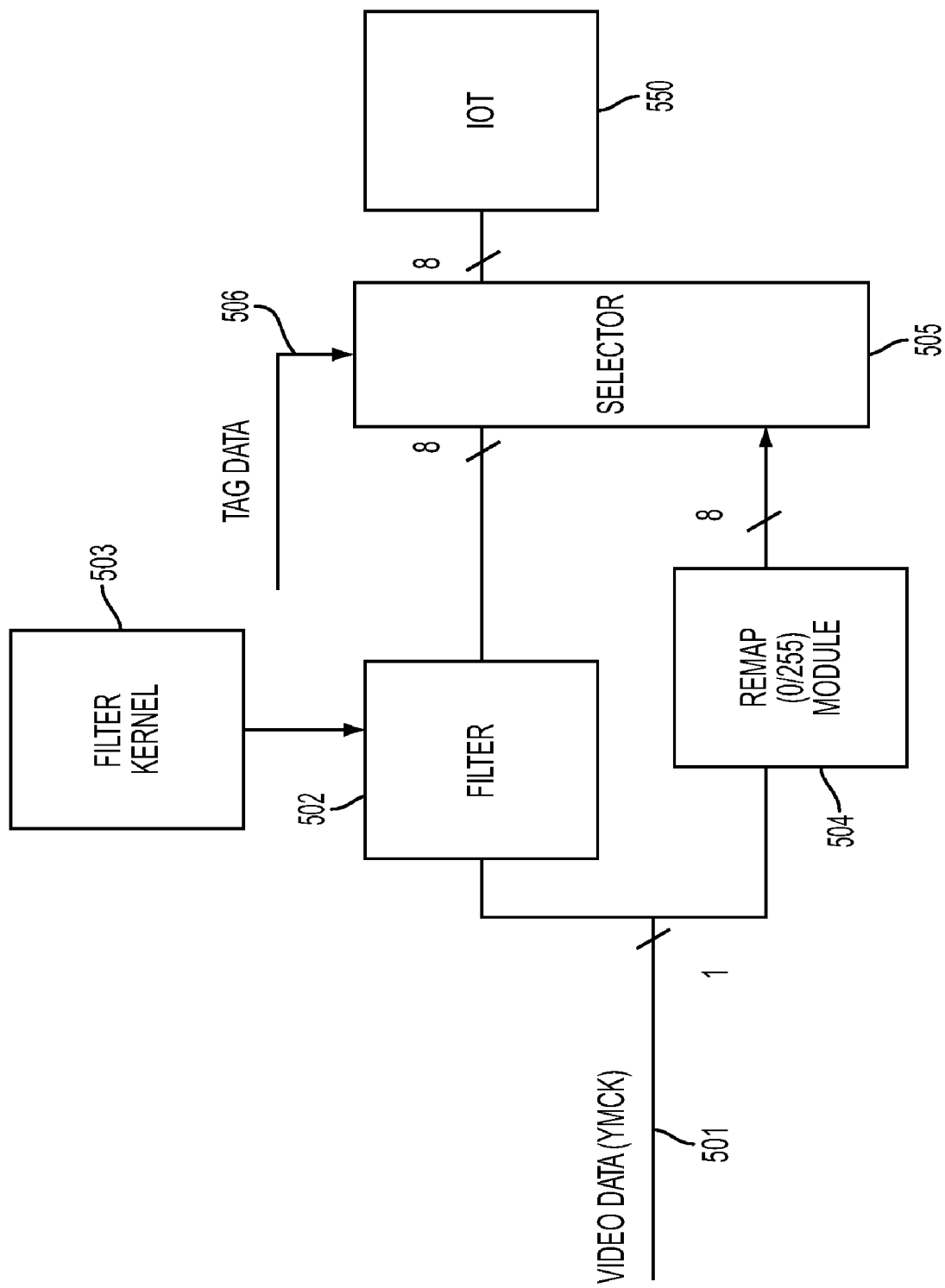
FIG. 5 illustrates a block diagram of another digital filtering process that uses tag data.

FIG. 5 illustrates a block diagram of an implementation of the process illustrated in FIG. 4. As illustrated in FIG. 5, image data 501 is sent to two modules. The first module, a digital filter module 502, accepts the image data and filters kernel data 503 and digitally filters the image data. The second module, a "255/0" module 504, outputs either 255 (all 8 bits ON) or 0 (all 8 bits OFF) depending on whether the input pixel has a value of "1" or "0." The output of these two modules is sent to a selector module 505. The output of the selector module 505, which is controlled by the tag data stream 506, is sent to an image output terminal (IOT) 550, which converts the image data to a hard copy of the image. If the tag bit is "1," the selector output is identical to the "255/0" module 504, and if the tag bit is "0," the selector output is identical to the output of the digital filter module 502.

If such is a filter is applied, the resulting output is an analog reconstruction of the original image. If the binary representation is of high enough resolution, the analog image is a close reproduction of the original image and there will be few or no visible artifacts.

Figure 6:
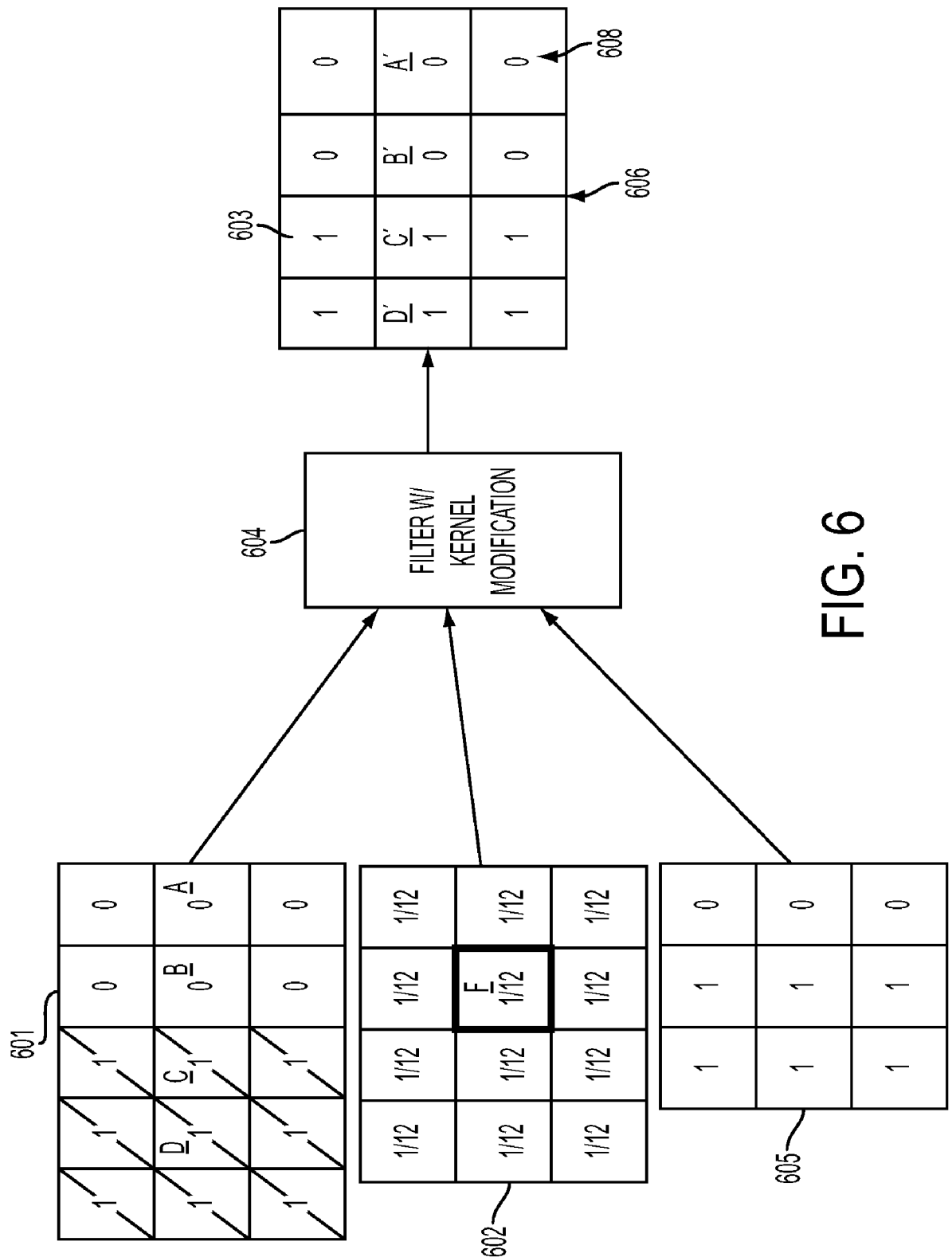
FIG. 6 illustrates a graphical representation of a digital filtering process that eliminates edge artifacts.

FIG. 6 schematically illustrates a process to the "ghost" artifact generated at pixel position A' in FIG. 4. More specifically, in FIG. 6, a portion of an image 601, in the form of a matrix, is shown. In the portion of the image 601, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 601. A filter kernel 602 provide a simple matrix of filter weights wherein an output pixel is the evenly weighted average of the nine pixels covered by the filter kernel 602. After a filter 604 performs the filtering operation, a portion of a output image 603 is generated.

The portion of the output image 603, as illustrated in FIG. 6, demonstrates that the original sharp edge of the portion of the image 601 has been converted to a sharp edge 606 with no ghost image artifact 608. More specifically, the original edge of the portion of the image 601 made the transition from "1" to "0" in a width of a single pixel. On the other hand, the filtered edge 606 of the portion of the output image 603 has a transition 606 from "1" to "0" being a width of a single pixel and no ghost artifact 608.

In other words, when the pixel A of the portion of the image 601 of FIG. 6 is processed by the filter 604, the output pixel A' of the portion of the output image 603 has a value of "0" indicating, in this example, no ghost artifact 608, assuming that the column to the right of the rightmost illustrated column contained only "0" values. It is noted that the pixel of interest has a filter position that is associated with the highlighted pixel position F.

The output value of output pixel A' of the portion of the output image 603 has a value of "0" because the pixels associated with the column of the portion of the image 601 associated with the pixel C of the portion of the image 601 were tagged as being edge pixels. Due to the pixels being tagged as edge pixels, the values associated with the pixels are not included in the filtering process. The filtering process is utilized because the pixel in question, the pixel A of the portion of the image 601, is not tagged as an edge. But since the filtering process would normally process edge associated pixels, the particular edge pixel values are individually excluded from the filtering process.

Moreover, when the pixel B of the portion of the image 601 is processed by the filter 604, the output pixel B' of the portion of the output image 603 has a value of "0" indicating, in this example, a white region because pixel B of the portion of the image 601 had been tagged as an edge, and thus, the filter value for the pixel B of the portion of the image 601 is not selected as the output value for output pixel B' of the portion of the output image 603, but the actual value of pixel B of the portion of the image 601 is passed through as the output pixel B' of the portion of the output image 603.

Furthermore, when the pixel C of the portion of the image 601 is processed by the filter 604, the output pixel C' of the portion of the output image 603 has a value of "1" indicating, in this example, a black region because pixel C of the portion of the image 601 had been tagged as an edge, and thus, the filter value for the pixel C of the portion of the image 601 is not selected as the output value for output pixel C' of the portion of the output image 603, but the actual value of pixel C of the portion of the image 601 is passed through as the output pixel C' of the portion of the output image 603.

Lastly, when the two columns to the left of the leftmost illustrated column contain only "1" values and the center pixel D of the portion of the image 601 is processed by the filter 604, the resulting output pixel D' of the portion of the output image 603 has a value of "1" indicating, in this example, a black region because pixel D of the portion of the image 601 had not been tagged as an edge, and thus, the filter value for the pixel D of the portion of the image 601 is selected as the output value for output pixel D' of the portion of the output image 603.

Figure 7:
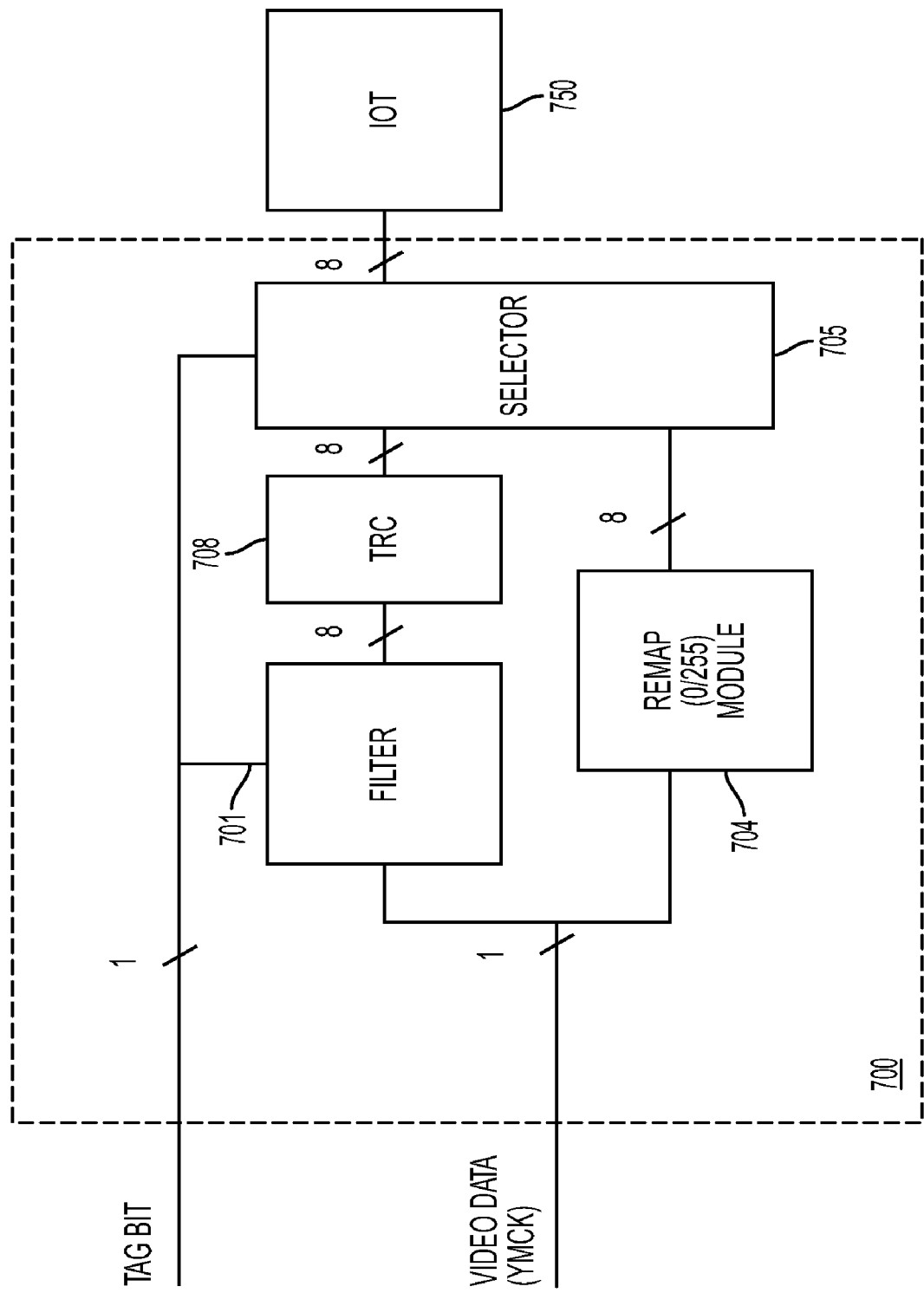
FIG. 7 illustrates a block diagram of a system utilizing the process of FIG. 6 and incorporating a tonal reproduction curve module.

FIG. 7 shows a block diagram of a device to implement the process illustrated in FIG. 6. As illustrated in FIG. 7, image data is sent to two modules. The first module, a digital filter module 701 accepts the image and tag data and digitally filters the image data. The second module, a Remap "255/0" module 704, outputs either 255 (all 8 bits ON) or 0 (all 8 bits OFF) depending on whether the input pixel has a value of "1" or "0." The output of these two modules is sent to a selector module 705. The output of the selector module 705, which is controlled by the tag data stream, is sent to an image output terminal (IOT) 750, which converts the image data to a hard copy of the image. If the tag bit is 1, the selector output is identical to the Remap "255/0" module 704, and if the tag bit is 0, the selector output is identical to the output of the digital filter module 701.

While the elements of FIG. 6 are essentially the same as in FIG. 4, the digital filter module 701 is modified to include an input from the tag data stream as well as the image stream. The filtering process of FIG. 7 requires that any edge pixel inside of the filter window is not included in the averaging process. By doing so, the edge pixels that are near the pixel under consideration are excluded from the averaging process. This essentially eliminates the edge artifacts from the reconstructed image.

The implementation of FIG. 7 can be described by the following logical equation:

$$t_x = \sum_i \sum_j x_{ij} * f_{ij} * w'_{ij}$$

where the $t_x$, $x_{ij}$ and $f_{ij}$ are as before, but $w'_{ij}$ is a weight value determined by the tag matrix.

If pixel ij in the tag matrix is 1, indicating that the pixel is an edge pixel, $w_{ij}$ is zero and the corresponding pixel in the binary image is not included in the output summation. In a different embodiment, if pixel ij in the tag matrix is 1, indicating that the pixel is an edge pixel, $w_{ij}$ is zero and the other weight coefficients may be modified to ensure that the remaining non-zero coefficients, when summed, equal a predetermined filter kernel matrix value. In a further embodiment, if pixel ij in the tag matrix is 1, indicating that the pixel is an edge pixel, wij is zero and the other weight coefficients may be modified to ensure that the remaining non-zero coefficients, when summed, equal a predetermined filter kernel matrix value of one. In these further embodiments, the coefficients or weights of the filter kernel associated with the remaining non-zero coefficients or weights are further modified to normalize the filter kernel matrix value.

As noted above, several additional features may be added to this system as alternatives. For example, the digital filter kernel is usually implemented so that the sum of the weights or coefficients in the filter matrix is normalized to 1. It is noted that the process may choose to re-normalize the filter matrix on the fly to take into account those weights or coefficients that are not used because the weights or coefficients coincide with tagged pixels. A way to implement this is to add an additional element to the module of FIG. 4.

FIG. 7 further shows a tonal reproduction curve circuit 708, which performs a tonal reproduction curve operation on the output of the digital filter 701. This tonal reproduction curve ("TRC") circuit 708 performs a simple table lookup operation to transform the output of the digital filter 701 to a new set of values that are consistent with the filter operation. It may consist of a plurality of tables that are selected by a signal from the digital filter 701. The signal may be computed by the digital filter 701 as a function of the number of filter elements that are eliminated by ignoring tagged pixels. The signal may also be based on the number of eliminated pixels, or by a more complex computation that renormalizes the filter kernel based on the weights or coefficients of the pixels that are not counted.

The TRC circuit may also function as a normal TRC circuit in that the tonal reproduction curve may be based on factors that are independent of the filter operations. For example, the tonal reproduction curve could compensate for the response of the image output terminal or print engine. The tonal reproduction curve could be calculated based on the image content and a desire to normalize the tone response curve of the system. Finally, the tonal reproduction curve can also be altered in response to user input, for example, to change the contrast or lightness/darkness of the output image. Of course, any of these tonal reproduction curves can be concatenated with a tonal reproduction curve to compensate for the filtering operations to give a single tonal reproduction curve that accomplishes all of these goals.

As noted above, the tag bit can be used to determine whether to apply the filter or not, but the tag bit can also be used for each individual pixel location to determine whether to use that pixel in the sum of the filtered pixels. This has the effect of eliminating ghosting around text on the output image.

Figure 8:
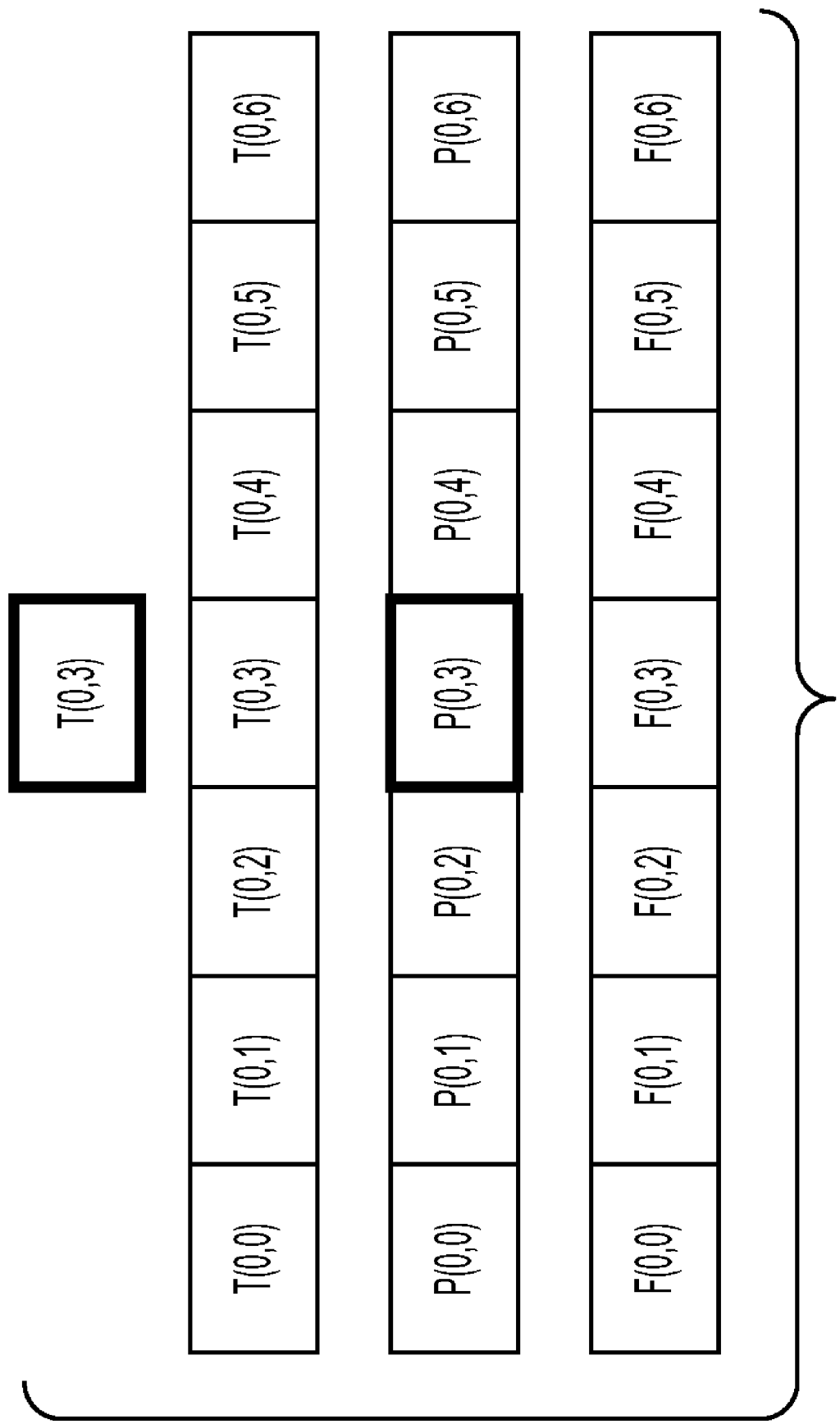
FIG. 8 illustrates an one-dimensional graphical representation of a digital filtering process that eliminates edge artifacts.

FIG. 8 provides another illustration of using the tag bit as part of the filtering operation to determine whether to include the individual pixels in the filtered total. Moreover, although the filtering process is typically a 2-dimensional process, FIG. 8 utilizes a 1-dimensional example for simplicity. In this example, the process is a binary data extended to contone process As illustrated in FIG. 8, the binary data extended to contone process is a filtering process utilizing a standard convolution operation upon an input pixel value P(0,3) to realize an output pixel value P'(0,3). As noted above, with respect to the conventional process, if the pixel P(0,3) is not tagged, namely T(0,3) is equal to zero, the output pixel value for P'(0,3) is the summation of the products $(P_{ij})(F_{ij})$. On the other hand, if the pixel P(0,3) is tagged, namely T(0,3) is equal to one, the output pixel value for P'(0,3) is equal to P(0,3).

With respect to a binary data extended to contone process that eliminates ghost artifacts, one embodiment, utilizing the illustration of FIG. 8, may operate as follows.

If the pixel P(0,3) is not tagged, namely T(0,3) is equal to zero, the output pixel value for P'(0,3) is the summation of the products $(P_{ij})(F_{ij})$ wherein $(P_{ij})(F_{ij})$ is only calculated when the value of T(i,j) equals zero. If the value of T(i,j) equals one, $(P_{ij})(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

With respect to a binary data extended to contone process that eliminates ghost artifacts, another embodiment, utilizing the illustration of FIG. 9, may operate as follows.

If the pixel P(0,3) is not tagged, namely T(0,3) is equal to zero, the output pixel value for P'(0,3) is the summation of the components of $(F_{ij})$ when both the value of T(i,j) equals zero and the value of P(i,j) is equal to one. If the value of T(i,j) equals one or the value of P(i,j) is not equal to one, $(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

Figure 9:
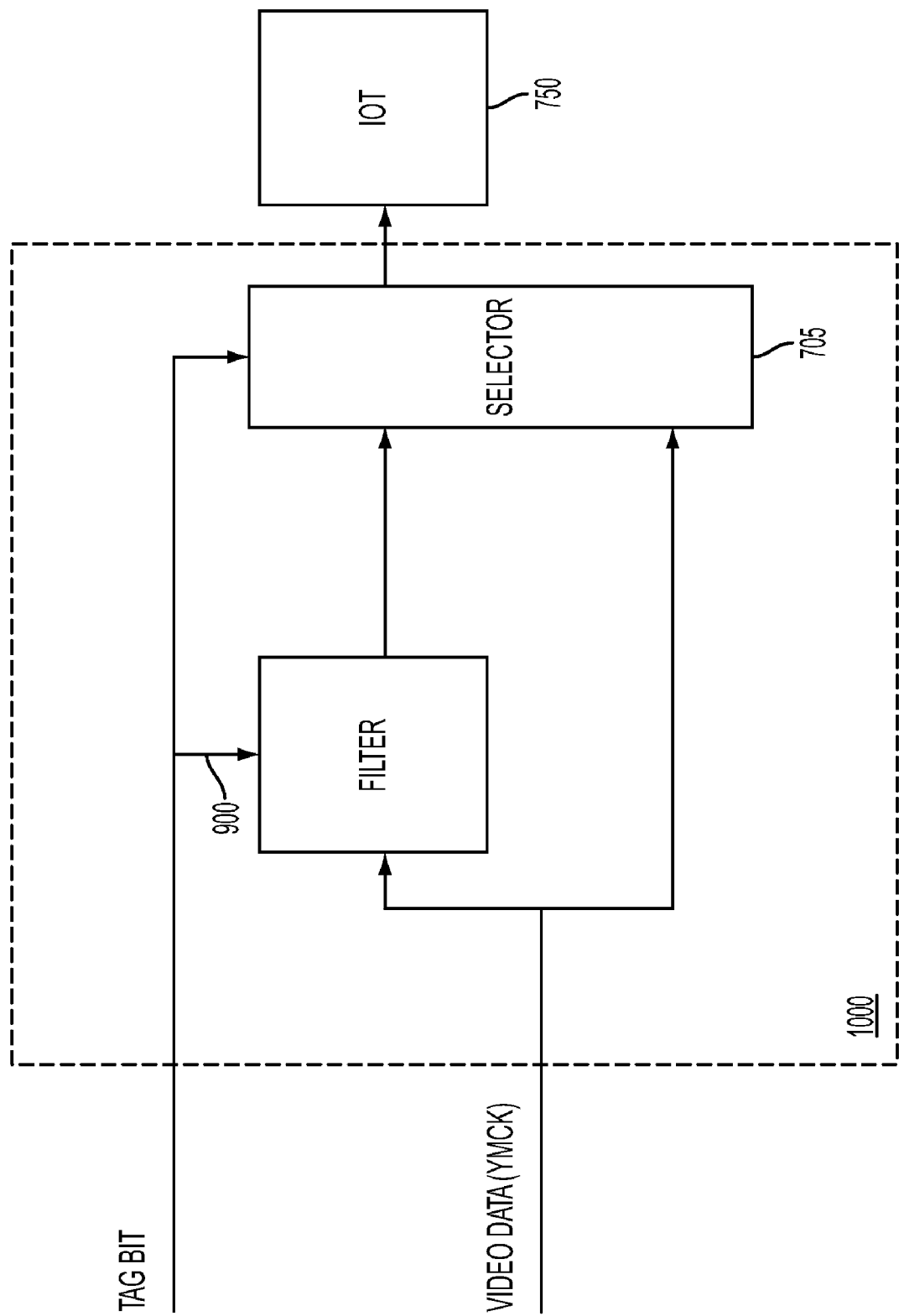
FIG. 9 illustrates a block diagram of a system utilizing a digital filtering process that eliminates edge artifacts.

FIG. 9 illustrates a system for converting edge-tagged pixels of image data to pixels of contone image data. As illustrated in FIG. 9, a filter 900 receives both image data and the tag bits. The filter 900 determine a tagged state value of each pixel of image data within a predefined neighborhood of pixels wherein each pixel of image data within the predefined neighborhood of pixels has an associated image value and a first pixel of image data within the predefined neighborhood of pixels is associated a first pixel of contone image data.

The filter 900 filters, using a predetermined set of filter weighting values wherein each pixel of image data within the predefined neighborhood of pixels has an associated filter weighting value, each image value of each pixel of image data within the predefined neighborhood of pixels having a tagged state value indicating that the pixel of image data is a non-edge pixel to generate a filtered image value for each pixel of image data within the predefined neighborhood of pixels having a tagged state value indicating that the pixel of image data is a non-edge pixel; assigns, a predetermined filtered image value to each pixel of image data within the predefined neighborhood of pixels having a tagged state value indicating that the pixel of image data is an edge pixel; and sums all filtered image values for the predefined neighborhood of pixels to produce an image data sum value.

Based on the tag value for the first pixel of image data within the predefined neighborhood of pixels, a selector 705 either allows, when the tagged state value of the first pixel of image data indicates the first pixel of image data is a non-edge pixel, the image data sum value to be assigned as an image data value for the first pixel of contone image data or the image data value of the first pixel of image data to be assigned as an image data value for the first pixel of contone image data. It is noted that the predetermined filtered image value may be zero. This process can be utilized when each pixel of image data within the predefined neighborhood of pixels has an associated binary image value.

Figure 10:
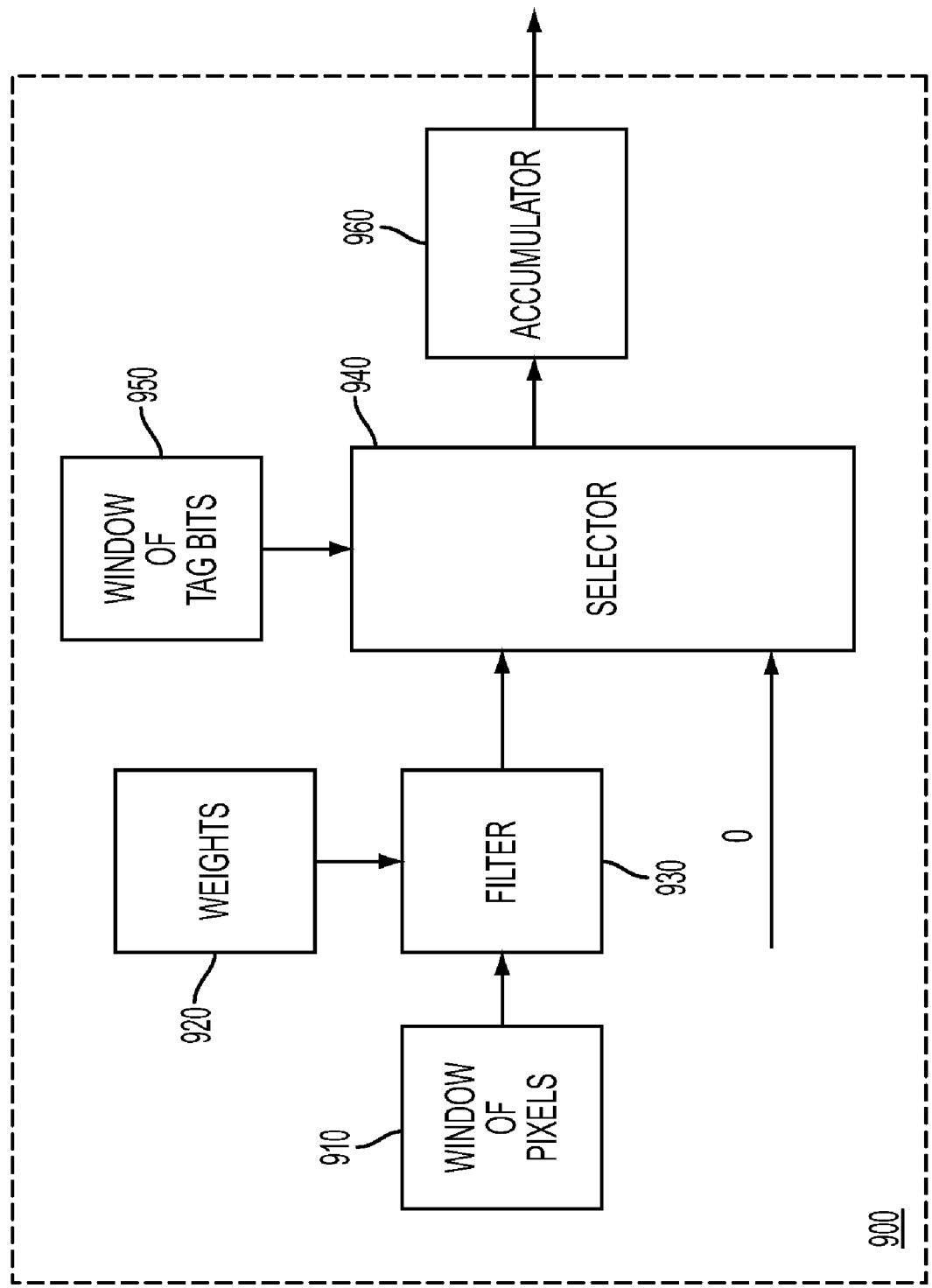
FIG. 10 illustrates a block diagram of a system utilizing a digital filtering process that eliminates edge artifacts.

FIG. 10 illustrates a filter circuit configuration that enables the converting of edge-tagged pixels of image data to pixels of contone image data. As illustrated in FIG. 10, a filter 900 includes a buffer 910 for storing a window of pixels. This window of pixels may be a two-dimensional matrix of image data. The image data within the buffer 910 is fed to a filter 930. The filter 930 also receives filter weights values from a filter weights buffer or memory 920.

Upon receiving the image data and the filter weights, the filter 930 multiplies each image data value with the associated filter weight value. The product is received by selector 940. Selector 940 selects between the product from filter 930 and a zero value based upon tag bit data received from a tag bit buffer or memory 950. More specifically, when the pixel associated with the product is tagged as a non-edge pixel, the selector 940 selects the product from filter 930. When the pixel associated with the product is tagged as an edge pixel, the selector 940 selects the zero value. The selected value is received by accumulator 960 which generates the non-edge image data value for the contone image.

Figure 11:
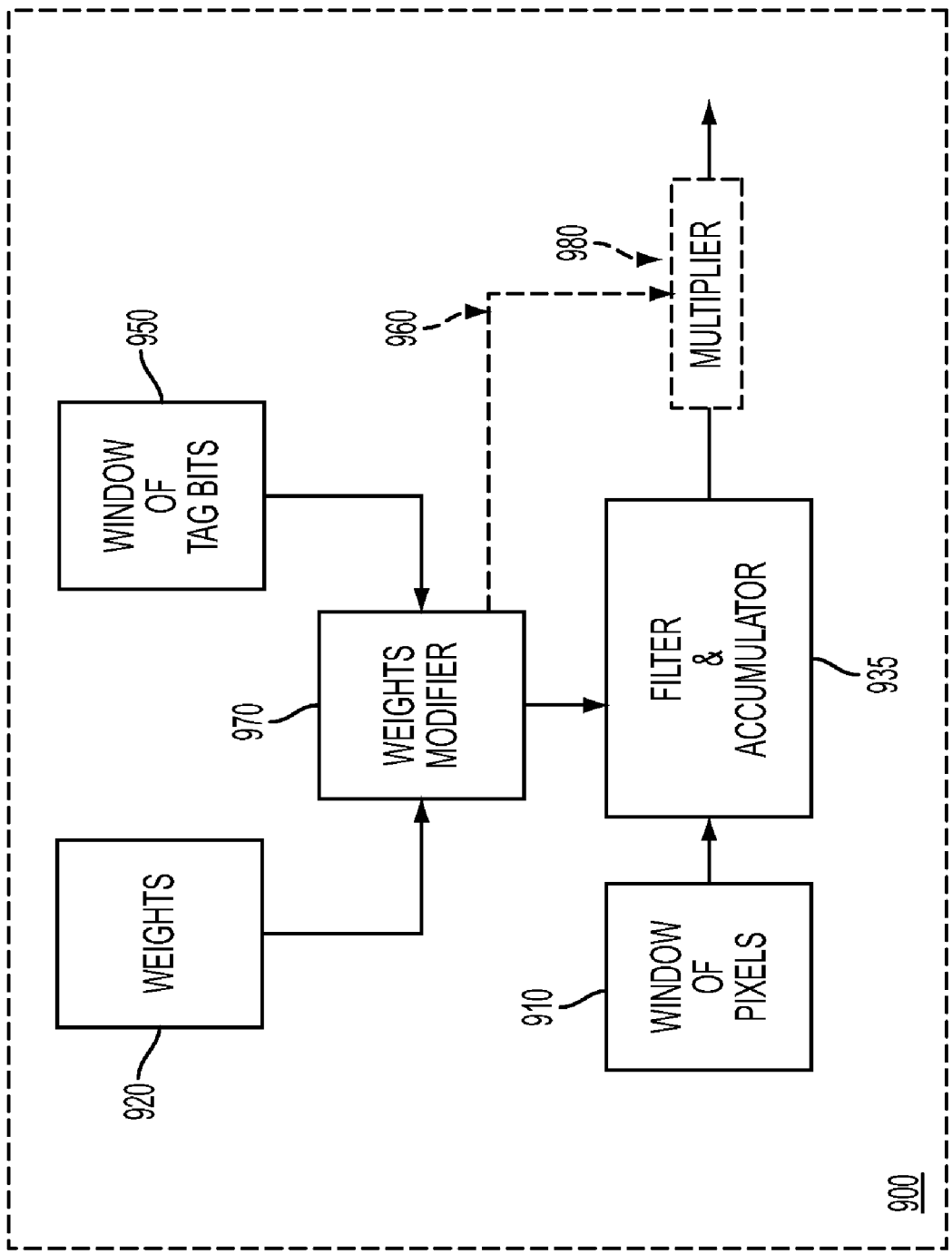
FIG. 11 illustrates a block diagram of a system utilizing a digital filtering process that eliminates edge artifacts.

FIG. 11 illustrates another filter circuit configuration that enables the converting of edge-tagged pixels of image data to pixels of contone image data. As illustrated in FIG. 11, a filter 900 includes a buffer 910 for storing a window of pixels. This window of pixels may be a two-dimensional matrix of image data. The image data within the buffer 910 is fed to a filter & accumulator 935. The filter & accumulator 935 also receives filter weights values from a filter weights modifier circuit 970.

Upon receiving the image data and the filter weights, the filter & accumulator 935 multiplies each image data value with the associated filter weight value. The product is the generated non-edge image data value for the contone image.

As further illustrated in FIG. 11, the filter weights modifier circuit 970 receives filter weights values from a filter weights buffer or memory 920 and tag bit data from a tag bit buffer or memory 950. The filter weights modifier circuit 970 utilizes this data, in a variety of ways to create a matrix of modified filter weight values to be utilized by the filter & accumulator 935.

For example, the filter weights modifier circuit 970 determines a tagged state value of each pixel of image data within a predefined neighborhood of pixels and a number, N, pixels of image data within the predefined neighborhood of pixels having a tagged state value indicating that the pixel of image data is a non-edge pixel. In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

In another example, the filter weights modifier circuit 970 determines a tagged state value of each pixel of image data within a predefined neighborhood of pixels and a sum, S, of all filter weighting values within the predetermined set of filter weighting values associated with pixels of image data within the predefined neighborhood of pixels having a tagged state value indicating that the pixel of image data is a non-edge pixel. In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

Another alternative for modifying the filter weights is to use the sum of the filter weights of either the excluded pixels, or of only the included pixels, and using this value as the entry into a lookup table whose output can be a factor by which to multiply the remaining, non-excluded filter, weights, the filter weights associated with pixels having a tag value indicating a non-edge. This can be applied internally to the filter weights in element 970 of FIG. 11, or alternatively, the weight can be output, as signal 960, from the weights modifier element 970 and applied as an input to a multiplier element 980 where it multiplies the output of the digital filter.

More specifically, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

On the other hand, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

Furthermore, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 may apply the sum as an input to a lookup table, and a multiplier may be used to multiply the image data sum value by an output value from the lookup table, corresponding to inputted sum to modify the image data sum value.

Lastly, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 may apply the sum as an input to a lookup table, and a multiplier may be used to multiply the image data sum value by an output value from the lookup table, corresponding to inputted sum to modify the image data sum value.

If the print data can be encoded with a tag image, the data from the print side will be processed by the same resolution conversion module in the image path and the print and copy/scan parts of the machine. Furthermore, the print and copy image quality will be similar which is a desirable effect.

In most page description language conversion software, the user's ability to specify the halftoning capabilities is limited. In many cases, the user can specify the bit depth, the number of bits per pixel in the image, and may also be able to specify the details of the halftone matrix to be used. However, while most page description language conversion software allows the generation of contone images, none of the normal channels allow the generation of a tag image plane in parallel with a binary image plane.

Notwithstanding, some of the software that converts the page description language to print data provides for an alternative interface to the program that allows the user of the program to add program code to implement a custom halftone procedure. In simple form, such a halftone interface passes a contone image plane to the user developed code and receives back a halftoned image. All that is needed is to provide, via the halftone interface, a code module that accepts contone image and generates both a binary image and a tag image plane, preferably to combine the image and tag data into a single image plane with two bits per pixel.

Figure 12:
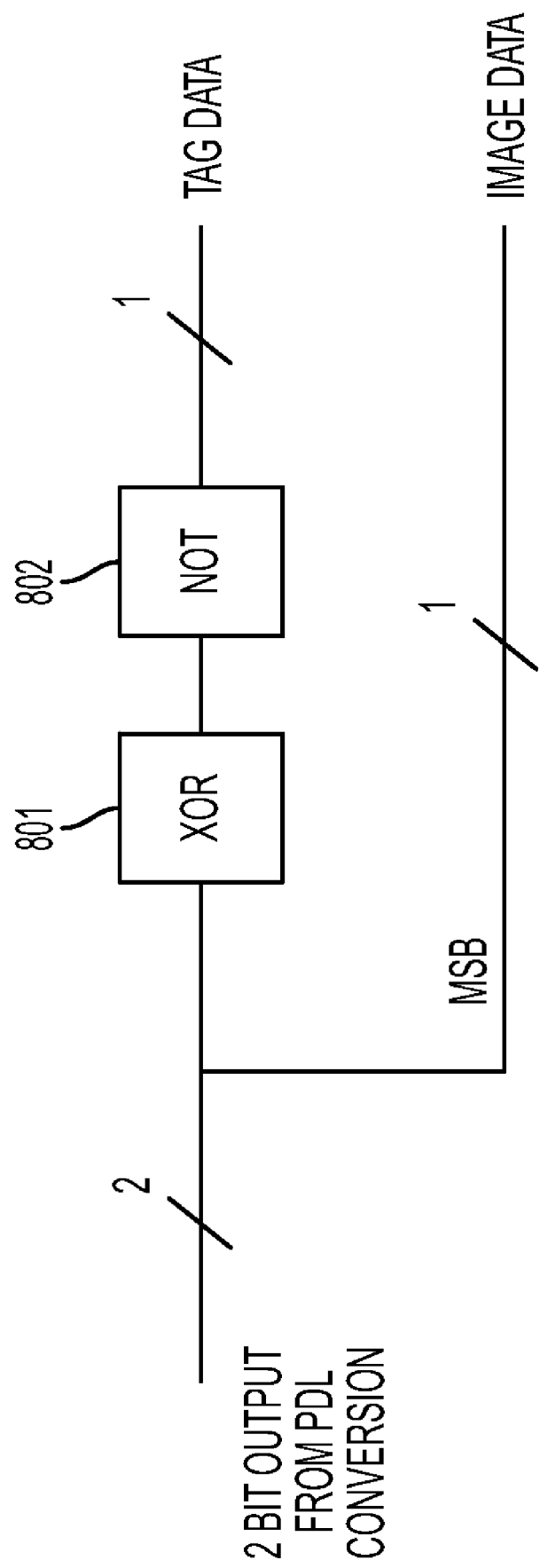
FIG. 12 illustrates a circuit to separate an encoded image into image and tag planes.

If the output from this software is a single image plane with two bits per pixel, combining the image and tag data, FIG. 12 illustrates an example of a circuit that separates the two bit per pixel image back into two separate planes. More specifically, FIG. 12 illustrates a simple circuit to implement the separation of the image data stream and the tag data stream from the two bit combined output of the page description language to print conversion. In the circuit, the two bit per pixel data stream that is output from the page description language to print conversion stage is passed through a XOR circuit 801 and inverted in a NOT gate 802 whose output is the tag data stream. In parallel, the high order (MSB) bit is separated and passed as the image data.

Thus, the high order bit of the two bit output represents the image value. As noted above, the tag bit can be recovered by doing a NXOR (an inverted XOR) operation on the two bits. In this case, if the output of the tag extraction circuit (801 and 802) is non-edge data, the output is defined as "0." On the other hand, if the output of the tag extraction circuit (801 and 802) is edge data, the output is defined as "1."

This separation can be done either in software or preferably in a simple hardware set of gates in the element of the image path that receives the two bit per pixel image from the print generation element.

FIG. 13 illustrates a (magnified) portion of a contone image before a halftoning process. The image consists of the character "1" (cells having a value 255) with a diagonal area of grey (cells having a value 127) running from lower left to upper right. The numbers in each cell represent the contone values for the image. The character is assumed to be solid black, while the diagonal area is an intermediate gray, here chosen to be "127" for illustrative purposes. In FIG. 13, pixels A and D have a value of "255." Pixels E, F, and G have a value of "0." Pixels B and C have a value of "127."

FIG. 14 illustrates the image of FIG. 13 after being halftoned using a halftone interface that passes a contone image plane to the user developed code and receives back a halftoned image. The halftone interface, in this example, uses a simple halftone dot. It is noted that the halftone dot used by the halftone interface is merely a matter of choice.

More specifically, the halftone encoding process outputs "11" for full ON or "00" for full OFF if the contone pixel being halftoned is either full ON (255) or OFF (0) because the halftone encoding process assumes that the contone pixel is part of an edge. On the other hand, the halftone encoding process outputs "10" if the halftone bit is a "1" and outputs a "01" if the halftone bit is a "0."

The character and the surrounding white space have been encoded as either "11" or "00," but the grey area is encoded as alternative "01" and "10." In FIG. 14, pixels A and D have a value of "11." Pixels E, F, and G have a value of "00." Pixels B and C have a value of "01" and "10," respectively.

Figure 15:
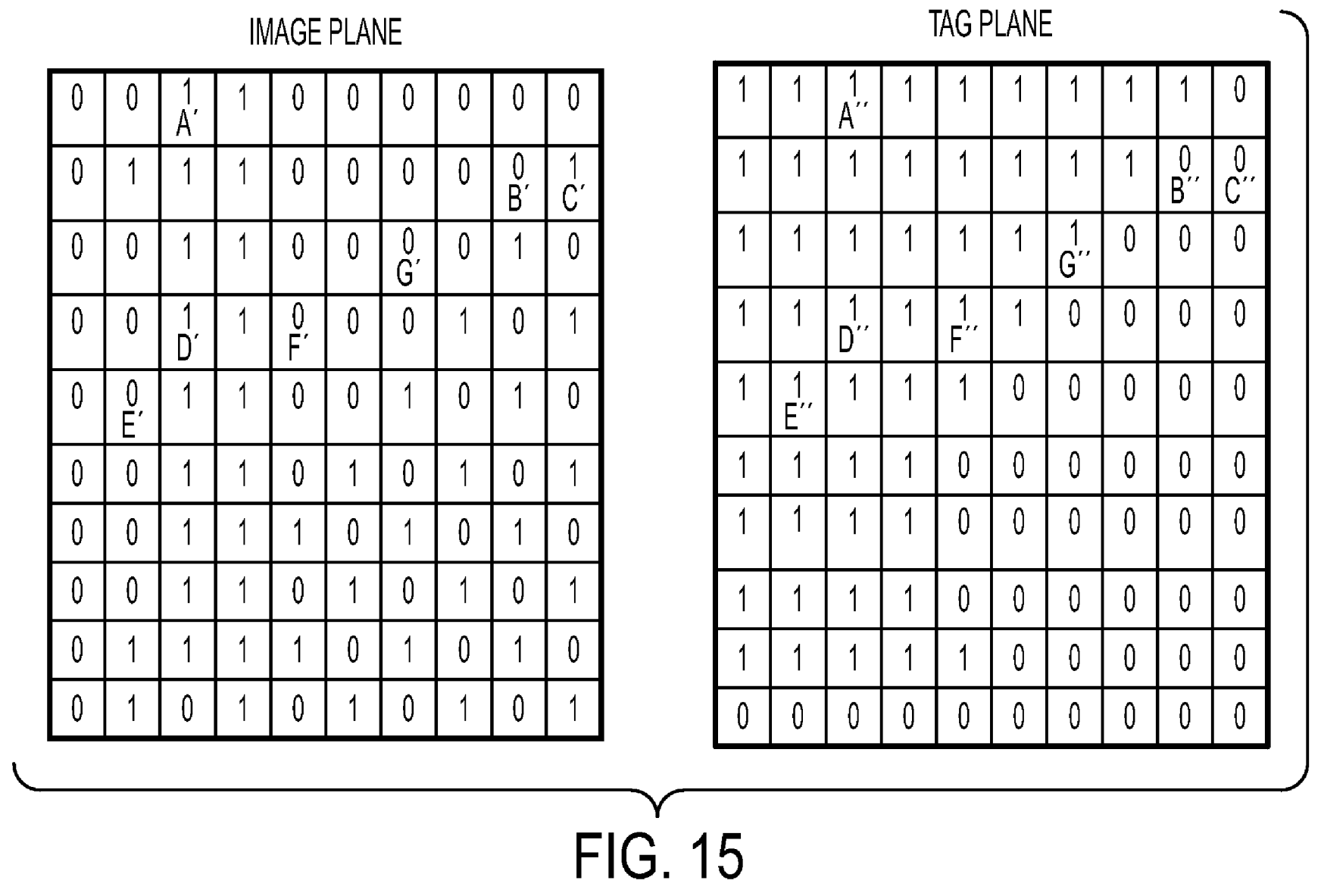

FIG. 15 illustrates the extraction of the image and tag planes from the two bit halftoned encoded image of FIG. 14. For example, pixels A and D in the image in FIG. 14 are "11" and generate image bits of 1 at A' and D' in FIG. 15 and tag bits of 1 at A" and D" in FIG. 15. Pixels E, F, and G in the image in FIG. 14 are "00" and generate image bits of 0 at E', F', and G' in FIG. 15 and tag bits of 1 at E", F", and G" in FIG. 15. The pixel at B of FIG. 14, which is part of the grey area, is separated into an image bit of "0" at B' in FIG. 15 and a tag bit of "0" at B" in FIG. 15. Pixel at C in FIG. 14, which is also part of the grey area, is separated into an image pixel of "1" at C' in FIG. 15 and a tag bit of "0" at C" in FIG. 15.

In FIG. 16, the image of image plane, as illustrated in FIG. 15, is processed by a simple digital filtering operation to reconstruct the contone image. In this illustrative example, a simple 3×3 digital filter with averaging of the pixels in the filter window is used producing results in the range 0-255, corresponding to 8 bits per pixel image depth. Several problems are immediately apparent.

The pixel at position A has a value of only 142 compared to the original value of 255, and the pixel at position D has a value of only 170 compared to the original value of 255. This problem is caused by the filter averaging some of the 0 pixels in the neighborhood of pixels A and D, thereby reducing the values thereof. The result of this defect is that the character is lighter than desired.

Conversely the pixels at E and F have a value of 85 (⅓ of maximum) instead of a value of 0. This problem is caused by the filter averaging some of the dark pixels from the character. The result of this defect is that the character's edges are smeared making it less sharp and harder to read.

Finally, the pixel at G is higher than its ideal value of 0 because the filter averaged it with some of the pixels from the gray area in the original.

FIG. 17 illustrates reconstructing the image of image plane, as illustrated in FIG. 15 using the tag bits and the reconstruction scheme shown in FIG. 6 and described above. As illustrated in FIG. 17, many of the defects that are generated in the non-tagged image have been eliminated.

For example, the pixels at A and D are at the full value of 255. The pixels at E and G are at the proper value of 0. Eliminating the defects, the character is reproduced at full value, and the character's edges are sharp and well delineated, making the character easy to read. Also, the pixel at G is now 0, since it was marked as an "edge" and not filtered, making the edge of the gray region sharper and improving the appearance thereof.

While we have described the simplest way to implement a tagging scheme within the print page generation process that is compatible with that used for the copy and scan side of the multifunction machine, there are other methods available as well. For example, there exist methods to scan an image and identify those parts of the image that are part of line art or text as opposed to those parts of the image that are graphic or pictorial in nature. These methods could be applied to the contone image that is passed to the OEM halftone routine, but they are much more computationally intensive. These methods are well known to those skilled in the art and will not be further described here.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for converting a first pixel of image data to a first pixel of contone image data, comprising:

(a) electronically converting an image described in a page description language to a contone image;

(b) electronically halftoning and encoding the contone image to generate two bits of data;

(c) electronically determining a tagged state value for each pixel of a plurality of pixels of image data based upon the two bits of data and determining image data for a pixel based upon one of the two bits of data;

(d) electronically reconstructing a first pixel of image data to create reconstructed contone image data;

(e) electronically summing a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient and a corresponding pixel value when the tagged state value of the corresponding pixel of image data indicates that the corresponding pixel of image data is a non-edge pixel;

(f) electronically selecting, when the tagged state value of the first pixel of image data indicates the first pixel of image data is a non-edge pixel, the summed contone image data as an image data value for the first pixel of contone image data; and (g) electronically selecting, when the tagged state value of the first pixel of image data indicates the first pixel of image data is an edge pixel, the reconstructed contone image data as the image data value for the first pixel of contone image data.

2. The method as claimed in claim 1, wherein a tagged state value dependent weighted pixel value is equal to a product of a coefficient, a window coefficient, and a corresponding pixel value when the tagged state value of the corresponding pixel of image data indicates that the corresponding pixel of image data is a non-edge pixel, the window coefficient being equal to 1/n wherein n is a number pixels of image data within the predefined neighborhood of pixels having a tagged state value indicating that the pixel of image data is a non-edge pixel.

3. The method as claimed in claim 2, wherein each pixel of image data within the predefined neighborhood of pixels has an associated binary image value.

4. The method as claimed in claim 1, wherein a tagged state value dependent weighted pixel value is equal to a product of a coefficient, a window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the window coefficient being equal to 1/S wherein S is a sum of all coefficient values within the predefined neighborhood of pixels.

5. The method as claimed in claim 4, wherein each pixel of image data within the predefined neighborhood of pixels has an associated binary image value.

6. The method as claimed in claim 1, further comprising:
(h) performing a tonal reproduction curve operation upon the selected image data value for the first pixel of contone image data when the tagged state value of the first pixel of image data indicates the first pixel of image data is a non-edge pixel.

7. The method as claimed in claim 1, wherein a tagged state value dependent weighted pixel value is equal to a product of a coefficient, a non-edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is a non-edge pixel.

8. The method as claimed in claim 1, wherein a tagged state value dependent weighted pixel value is equal to a product of a coefficient, an edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is an edge pixel.

9. The method of claim 1, wherein the determination of the tagged state value for each pixel of a plurality of pixels of image data is based upon a logical XOR operation of the two bits of data.

10. The method of claim 1, wherein the determination of the tagged state value for each pixel of a plurality of pixels of image data is based upon a logical NXOR operation of the two bits of data.

11. A system for converting a first pixel of image data to a first pixel of contone image data, comprising:
a conversion circuit to convert an image described in a page description language to a contone image;
an encoder circuit to halftone and encode the contone image data to generate two bits of data;
a conversion circuit to convert each pixel of two-bit data from said encoder circuit to edge tag data, having a tagged state value, based upon the two bits of data and image data based upon one of the two bits of data;
a reconstruction circuit to create reconstructed contone image data from a first pixel of image data;
a filtered summing circuit to sum a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient and a corresponding pixel value when the tagged state value of the corresponding pixel of image data indicates that the corresponding pixel of image data is a non-edge pixel; and
a selection circuit, operatively connected to said filtered summing circuit and said reconstruction circuit, to select, when the tagged state value of the first pixel of image data indicates the first pixel of image data is a non-edge pixel, the summed contone image data as an image data value for the first pixel of contone image data and to select, when the tagged state value of the first pixel of image data indicates the first pixel of image data is an edge pixel, the reconstructed contone image data as the image data value for the first pixel of contone image data.

12. The system as claimed in claim 11, wherein a tagged state value dependent weighted pixel value is equal to a product of a coefficient, a window coefficient, and a corresponding pixel value when the tagged state value of the corresponding pixel of image data indicates that the corresponding pixel of image data is a non-edge pixel, the window coefficient being equal to 1/n wherein n is a number pixels of image data within the predefined neighborhood of pixels having a tagged state value indicating that the pixel of image data is a non-edge pixel.

13. The system as claimed in claim 11, wherein a tagged state value dependent weighted pixel value is equal to a product of a coefficient, a window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the window coefficient being equal to 1/S wherein S is a sum of all coefficient values within the predefined neighborhood of pixels.

14. The system as claimed in claim 11, wherein a tagged state value dependent weighted pixel value is equal to a product of a coefficient, a non-edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is a non-edge pixel.

15. The system as claimed in claim 11, wherein a tagged state value dependent weighted pixel value is equal to a product of a coefficient, an edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is an edge pixel.

16. The system as claimed in claim 11, further comprising:
a tonal reproduction curve circuit, operatively connected to said filtered summing circuit, to perform a tonal reproduction curve operation upon the create summed contone image data to produce a corrected summed contone image data;

said selection circuit selecting, when the tag of the first pixel of image data indicates the first pixel of image data is a non-edge pixel, the corrected summed contone image data as an image data value for the first pixel of contone image data.

17. The system of claim 11, wherein said conversion circuit converts each pixel of two-bit data from said encoder circuit to edge tag data based upon a logical XOR operation of the two bits of data.

18. The system of claim 11, wherein said conversion circuit converts each pixel of two-bit data from said encoder circuit to edge tag data based upon a logical NXOR operation of the two bits of data.

* * * * *